US011537846B2

(12) United States Patent
Hwang et al.

(10) Patent No.: US 11,537,846 B2
(45) Date of Patent: Dec. 27, 2022

(54) NEURAL NETWORK ARCHITECTURE WITH CONCURRENT UNCERTAINTY OUTPUT

(71) Applicant: Wisconsin Alumni Research Foundation, Madison, WI (US)

(72) Inventors: Seong Jae Hwang, Madison, WI (US); Ronak R. Mehta, Madison, WI (US); Vikas Singh, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1164 days.

(21) Appl. No.: 16/107,382

(22) Filed: Aug. 21, 2018

(65) Prior Publication Data
US 2020/0065648 A1 Feb. 27, 2020

(51) Int. Cl.
*G06N 3/08* (2006.01)
*G06N 3/04* (2006.01)

(52) U.S. Cl.
CPC .............. *G06N 3/0445* (2013.01); *G06N 3/08* (2013.01)

(58) Field of Classification Search
CPC ....... G06N 3/0445; G06N 3/08; G06N 3/0454
See application file for complete search history.

(56) References Cited

U.S. PATENT DOCUMENTS

| 2019/0122073 | A1* | 4/2019 | Ozdemir | ............... A61B 6/5217 |
| 2019/0347548 | A1* | 11/2019 | Amizadeh | ............ G06N 3/0472 |
| 2019/0378051 | A1* | 12/2019 | Widmann | .............. G06N 20/00 |
| 2020/0021873 | A1* | 1/2020 | Swaminathan | .... G06Q 30/0276 |

OTHER PUBLICATIONS

Hefron et al., "Deep long short-term memory structures model temporal dependencies improving cognitive workload estimation", May 20, 2017, Pattern Recognition Letters 94 (2017), pp. 96-104. (Year: 2017).*
Li et al., "A Spiking Recurrent Neural Network", 2004, Proceedings of the IEEE Computer Society Annual Symposium on VLSI Emerging Trends in VLSI Systems Design (ISVLSI'04), pp. 1-2. (Year: 2004).*
Wang et al.; "Natural-Parameter Networks: A Class of Probabilistic Neural Networks"; 30th Conferenece on Neural Information Processing Systems (NIPS 2016) pp. 1-9. Barcelona, Spain.

* cited by examiner

*Primary Examiner* — Ying Yu Chen
(74) *Attorney, Agent, or Firm* — Boyle Fredrickson, S.C.

(57) ABSTRACT

A neural net processor provides twin processing paths trainable using different moments of the input data, one moment providing a proxy for uncertainty. Subsequent operation of the trained neural net allows monitoring of the uncertainty proxy to provide real-time assessment of neural net model-based uncertainty.

13 Claims, 3 Drawing Sheets

NEURAL NETWORK ARCHITECTURE WITH CONCURRENT UNCERTAINTY OUTPUT

STATEMENT REGARDING FEDERALLY SPONSORED RESEARCH OR DEVELOPMENT

This invention was made with government support under AG040396 awarded by the National Institutes of Health and IIS1252725 awarded by the National Science Foundation. The government has certain rights in the invention.

CROSS REFERENCE TO RELATED APPLICATION

-

BACKGROUND OF THE INVENTION

The present invention relates generally to computer architectures and, in particular, to a neural network architecture that can produce a concurrent output of uncertainty with respect to the prediction of the neural network.

Artificial neural networks (henceforth neural networks) are computing systems generally inspired by the brain. A common design of a neural net provides multiple layers of "neurons" where each layer has multiple connections to preceding and/or succeeding layers. Each of the multiple inputs to each neuron is associated with a weight, and the neuron provides an output that is a function of the weighted sum of the data from the input connections.

The final layer of the neural net may provide a classification or prediction, for example, expressed as an output vector having elements associated with different classification or prediction possibilities. In a common example of a neural net that is trained to review image data and classify that image data, the output vector may classify the image according to whether it shows a particular object, for example, an automobile or a pedestrian.

The weights of the neural network are obtained by a training process in which example data with known classification is provided in a "training set" to the neural network and the weights adjusted iteratively so that the output classification converges to the known classification of the training set data. This process may be conducted "off-line" before the neural network is used.

During use, a neural net processor is loaded with the trained weights and proceeds to categorize data using those weights by passing data through the connections between neurons to the final classification layer. A significant benefit to neural network architectures is that specific A variation in design of neural nets is a so-called "recurrent neural net" in which the multiple layers of the network are implemented by looping the data in multiple passes through the neuron-like "units". Such recurrent neural networks are particularly useful in sequence prediction tasks such as machine translation, speech recognition, and some medical applications. Example recurrent neural networks include the "Long- and Short-Term Memory" (LSTM) and the "Gated Recurrent Unit" (GRU) generally known in the art.

The prediction output of a neural network can have varying degrees of unpredictability produced by inaccuracies in the input data itself (e.g., noise), uncertainty introduced by the neural net model itself ("model uncertainty"), or uncertainty because the data processed by the neural net differs fundamentally from the data used in training the neural net ("out-of-domain uncertainty").

The fact that a neural net is operating to produce an output prediction generally does not indicate how much uncertainty there is in the output prediction. Yet, having an understanding of the uncertainty experience by the neural net is clearly important in many neural net applications. As one example, when such neural net systems are used in autonomous vehicle control, a measurement of uncertainty could indicate a risk of vehicle error such as failure to detect a pedestrian. Similarly, when a neural net system is used for disease prediction, a measure of uncertainty might be necessary for regulatory approvals.

Some work has been done in measuring the uncertainty of neural nets using "sampling." In sampling, in between each input, operation of the neural net is paused, and the hidden state of the neural net is investigated by probing the neural net with a set of randomly generated samples and measuring the statistical variation in the output. This approach may not be computationally feasible for many practical neural network applications.

SUMMARY OF THE INVENTION

The present invention provides a way of evaluating a neural network uncertainty without sampling or interruption of the neural net processing. In the invention, the neural net is trained by input data represented as two different statistics from the distribution distributions (for example, mean and variance) of the training data, and the neural net circuitry is adjusted to preserve these distributions (within a family of distributions) as they are processed by the neural network. With properly trained neural net weights, during use of the neural net, output data from the neural net is accompanied by a statistical distribution that indicates uncertainty.

More specifically, the present invention provides a neural network architecture having a first and second input channel and a first and second output channel. The neural network provides a processing path from the first and second input channels to the first and second output channels through a set of units having weights trained with respect to data having different statistical moments as input on the first and second input channels, the units providing interaction between data of the first and second input channels. The processing path provides an output on the second channel indicating an uncertainty of the results expressed on the first input channel.

It is thus a feature of at least one embodiment of the invention to provide an uncertainty measurement for artificial intelligence devices such as neural networks that can be generated concurrently with the processed output of the neural network circuitry. In this respect, the invention can be distinguished from "sampling" type uncertainty systems that require, for example, time-consuming multiple Monte Carlo sampling of neural net hidden states.

The set of units may be implemented with at least one recurrent unit.

It is thus a feature of at least one embodiment of the invention to provide an uncertainty measurement system for an important class of neural networks providing recursion.

In some embodiments, the recurrent neural net may be a gated recurrent unit.

It is thus a feature of at least one embodiment of the invention to provide an uncertainty measurement system that works with an important class of well-characterized and analyzed recurrent neural networks.

The gated recurrent unit may provide a set of functional elements implementing a linear transformation of an input to the unit by applying weights and offsets followed by a nonlinear transformer preserving a family of the moment distribution of the second input channel.

It is thus a feature of at least one embodiment of the invention to provide neuron circuitry that preserves the distribution qualities of the moment used for uncertainty assessment as that moment passes through the units. The nonlinear transformer of the present invention may be distinguished from conventional sigmoid or hyperbolic tangent functions which do not directly provide the same protection of the distribution.

The weights may be obtained by training with inputs on the second input channel having a statistical moment selected from an exponential family of distributions.

It is thus a feature of at least one embodiment of the invention to make use of the well-studied exponential family of distributions amenable to neuron-type transformations while remaining within the exponential family.

The second input channel may have a statistical moment of variance.

It is thus a feature of at least one embodiment of the invention to make use of the statistical moment of variance which may be compressed by functions without causing the distribution to move outside of the exponential family.

The gated recurrent unit may provide a set of functional elements operating on inputs to the gated recurrent unit to produce outputs from the gated recurrent unit, and each functional element may have two halves processing signals associated respectively with the first output signal and the second output signal wherein each of the halves provides independent weight and bias factors, and wherein one half of each functional element processes an input associated with the first output signal only and the other half processes inputs associated with both the first and second output signals.

It is thus a feature of at least one embodiment of the invention to provide twin paths of processing within the unit that allow concurrent neural net calculations and uncertainty calculations.

The neural network architecture may include a decoder neural network receiving signals from an output of each unit to provide further decoding of that output.

It is thus a feature of at least one embodiment of the invention to permit arbitrary mapping of the output of the recurrent neural network including the uncertainty measurement to a different domain for different applications.

The neural network architecture may include a threshold detector monitoring the second output to indicate an uncertainty beyond a predetermined threshold.

It is thus a feature of at least one embodiment of the invention to provide a simple uncertainty signal that can be used for downstream control or to provide an indication to the user of neural network uncertainty.

These particular objects and advantages may apply to only some embodiments falling within the claims and thus do not define the scope of the invention.

DETAILED DESCRIPTION OF THE PREFERRED EMBODIMENT

Figure 1:
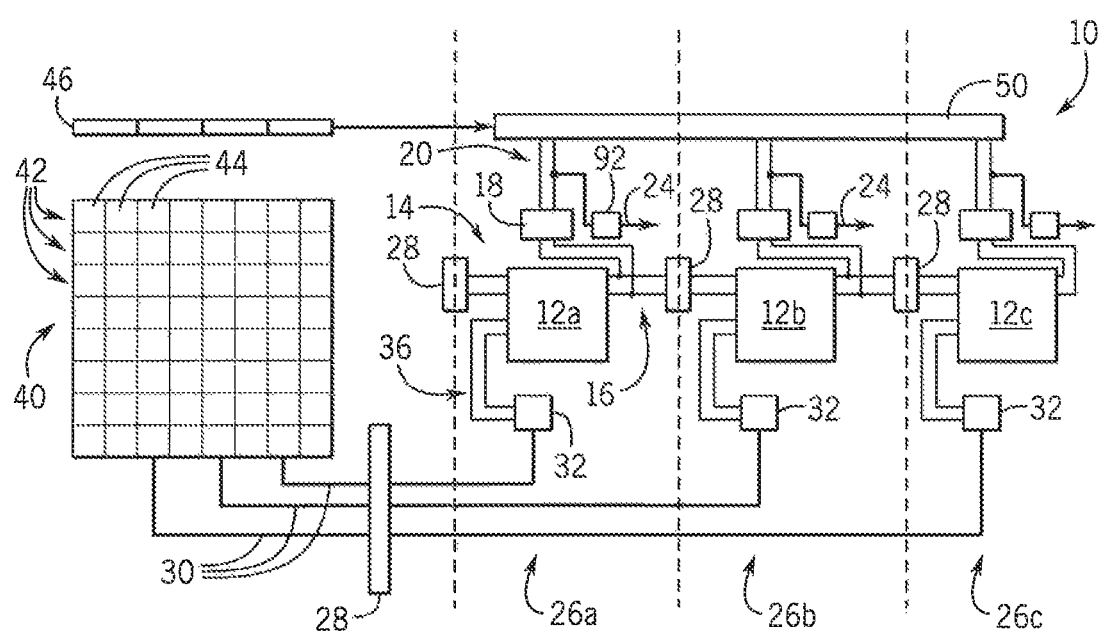
FIG. 1 is a block diagram of a neural network architecture per the present invention showing multiple units for receiving a training process processed to provide two different moments of the training data to the units.

Referring now to FIG. 1, a neural network architecture 10 may provide for a set of logical units 12a-12c (only three shown for clarity) providing inputs 14 for receiving moment data (as will be discussed below) and producing outputs 16 for passing that moment data to a succeeding unit 12 or to a decoder network 18. For all neurons 12 except for the last, the outputs 16 are termed hidden or latent outputs. The decoder network 18 may provide user output 20 of the neural network architecture 10, this user output 20 including both prediction data and uncertainty data as will be discussed below. The uncertainty data may be further processed by a threshold detector 92 to provide an alarm output 24 indicating that the prediction data is highly uncertain.

While each unit 12a-12c may be implemented as a separate circuit, the invention contemplates that the units 12 may be recurrent units and hence implemented by a single unit that is "unrolled" in multiple layers 26a, 26b, and 26c (also denoted layers) shown separated by dotted lines providing sequential operation. In the sequential operation, the inputs of each succeeding instance of a unit 12 receive the outputs from the previous instance of the unit 12 as managed by clocking and buffering circuitry 28. The same clocking and buffering circuitry 28 may provide successive inputs 36 to each instance 26 of the unit 12, for example, being part of a time series to be analyzed by the neural network architecture 10.

Generally, the circuitry of the neural network architecture 10 may be implemented as one or more dedicated integrated circuits or in a high-speed processor such as a graphics processor or the like having a stored program communicating with a memory.

Figure 2:
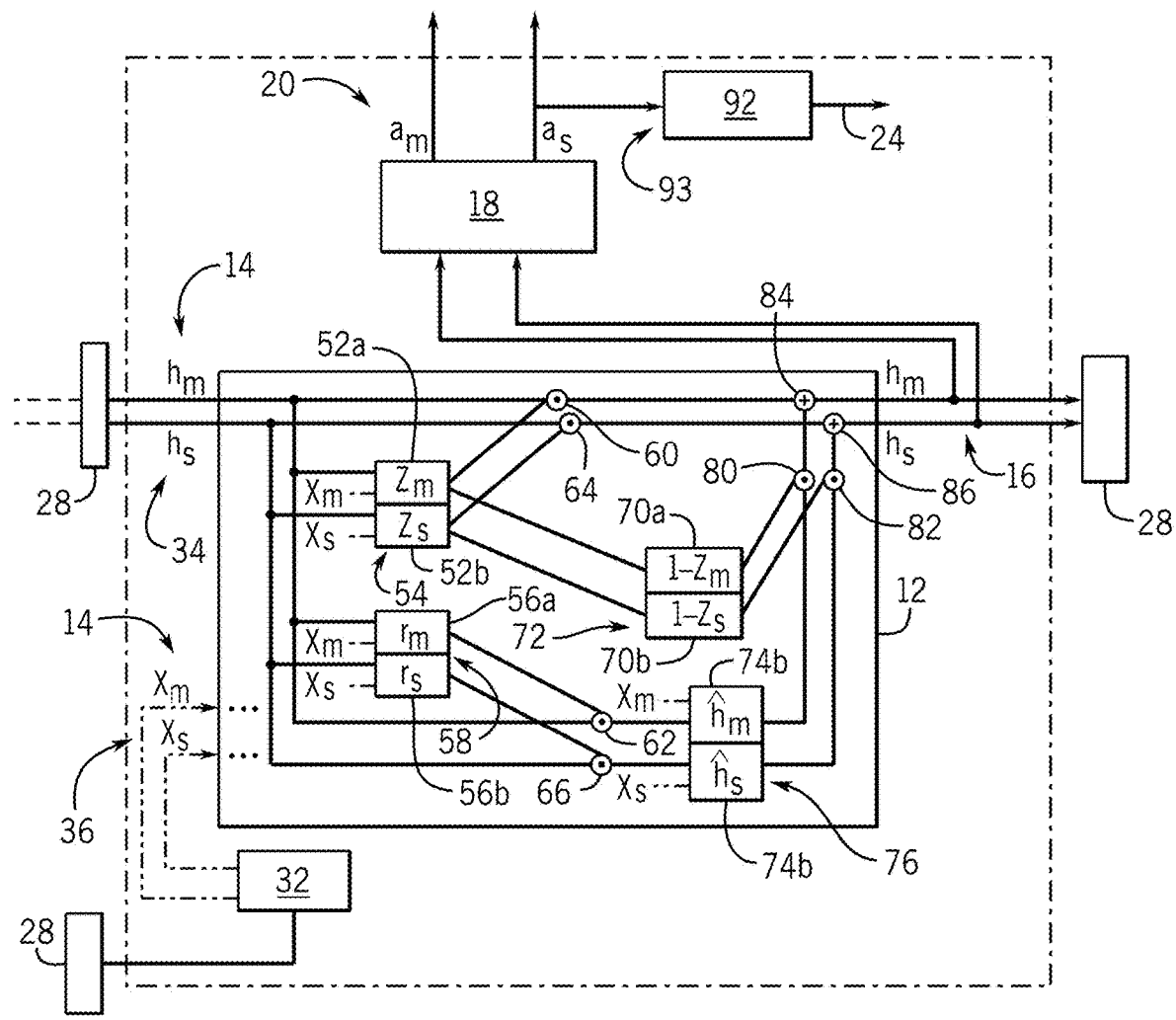
FIG. 2 is a detailed block diagram of a units of FIG. 1 showing twin paths through the unit for the different moments.

Referring now to FIGS. 1 and 2, each unit 12 may be associated with a moment extractor 32 which may extract statistical moments from a training set 40 as the inputs 36 provided to the neural network architecture 10 during training as will be discussed below.

Referring particularly to FIG. 2, each unit 12 may have an architecture similar to gated recurrent unit (GRU) neural network architectures but modified to provide twin data pathways for different moments of the inputs 36 as will now be discussed. These twin data pathways will loosely be associated with two different statistical moments of the training set 40 (in the preferred embodiment the mean (m) and the variance (s) of the training set 40), and generally each of the twin pathways will also be associated with a different one of the outputs 16 identified to the different statistical moments.

Specifically, the inputs 14 of each unit 12 may include recursive inputs 34 labeled $h_m$, $h_s$ associated with different of the twin pathways and corresponding with outputs 16 of any previous unit 12, these outputs similarly labeled $h_m$, $h_s$. The inputs 14 of the unit 12 may also include sequence data inputs 36 labeled $x_m$, $x_s$, being either from the training set 40 (through the moment extractor 32) or being data processed after training.

Referring now to both FIGS. 1 and 2, the training set 40 consists of a set of "examples" 42 represented by rows and each including ordered data elements 44, for example, being part of a time sequence. The data elements 44 of common columns (as depicted) have the same index, for example, the same time index. Each example 42 may, for example, be speech samples of the same sentence by different speakers, and each data element 44 is an audio waveform point or phoneme or other sequential elemental characteristic of speech. More generally, however, the invention is not limited to speech but will work with any orderable data set having different examples 42 including, for example, sequences of ordered image data.

Associated with the examples 42 of the training set 40 is a target output 46 indicating a common desired classification or prediction of the examples 42, being an output which should be provided by the neural network architecture 10 on the input of any example 42. This target output 46 need not be in the same domain as the examples 42; for example, if the examples 42 are short sentences, the target output 46 may be a classification of the sentences, for example, according to an arbitrary meaning domain. In this respect, in one example, the sentence examples 42 may be spoken commands to a virtual assistant and the target output 46 may be an extracted meaning of those spoken commands, for example, as a request to "turn the lights on." In other examples, the target output 46 may be expressed as a query input for a database extracted from spoken command examples 42.

Referring to FIG. 1, the present invention trains the neural network architecture 10 not with the individual data elements 44 but instead with statistical moments taken across columns of the training set 40. Thus, for example, during a first step of the training, the input $x_m$. may be provided to the neural network architecture 10 being a statistical mean taken along a first column of the training set 40 (at an index value 0), and the input $x_s$ provided to the neural network architecture 10 may be a statistical variance extracted from that same column 0. Both the mean and the variance may be extracted by a moment extractor 32 discussed above.

During this training, the unit 12 will operate recursively in each layer 26 so that at successive layers 26 in the recursion, new values of $x_m$, $x_s$ are received at increasingly higher index numbers (leftward columns) of the training set 40. In each layer 26, as mentioned before, the outputs $h_m$, $h_s$ from the previous layer become the inputs for the current layer as shown generally in FIG. 2 as managed by the clocking and buffering circuitry 28 (which recycles this data around to the same hardware elements).

At each iteration, the outputs $h_m$, $h_s$ For that layer 26 are also provided to the decoder network 18 which produces outputs 20 associated with the mean and variance labeled $a_m$, $a_s$ but in the domain of the target output 46. These outputs $a_m$, $a_s$ are provided to a back-projection circuit 50 which computes the difference between the outputs $a_m$, $a_s$ and the target output 46 to provide a back-projection delta value to the units 12, as is generally understood in the art of recurrent neural networks, to train the weights and offsets of the units 12. Ultimately this process produces a set of trained weights and offsets within the units 12 that will provide the desired output $a_m$, $a_s$ when the neural network architecture 10 receives actual data for processing.

Referring again to FIG. 2, as noted, within the unit 12 there are twin paths associated generally with mean and variance of the training data. The word "twin" is used instead of "parallel" to the extent that these paths are not independent but interact with each other as will be discussed below in the detailed description of the paths.

The first path in the unit 12 begins with the input value of $h_m$ as applied respectively to a first input of a first portion 52a of an update gate 54 and the first input of a first portion 56a of a reset gate 58. This value of $h_m$ is also received by one input of a first multiplier 60 and one input of a second multiplier 62.

Similarly, the second path in the unit 12 begins with the value of $h_s$ as applied along the second path respectively to a first input of a second portion 52b of the update gate 54 and a second input of a second portion 56b of the reset gate 58. This value of $h_s$ is also received by one input of a third multiplier 64 and one input of fourth multiplier 66.

Concurrently, the value of $x_m$ is applied respectively along the first path to a second input of first portion 52a of the update gate 54 and a second input of the first portion 56a of the reset gate 58. Similarly, the value of $x_s$ is applied respectively along the second path to a second input of the second portion 52b of the update gate 54 and a second input of the second portion 56b of the reset gate 58.

The update gate 54 operates on its inputs to produce intermediate outputs $o_{z,m}$, $o_{z,s}$ as follows:

$$o_{z,m}^t = U_{z,m} x_m^t + W_{z,m} h_m^{t-1} + b_{z,m} \tag{1}$$

$$o_{z,s}^t = U_{z,s} x_s^t + W_{z,s} h_s^{t-1} + b_{z,s} + [U_{z,m}]^2 x_s^t + U_{z,s}[x_m^t]^2 + [W_{z,m}]^2 h_s^{t-1} + W_{z,s}[h_m^{t-1}]^2$$

In the intermediate outputs $o_{z,m}^t$, $o_{z,s}^t$ and the right side equation components, the superscripts indicate the index value of the column of training set 40 (or the index value of a data element of the vector used in a non-training situation), and the subscripts simply indicate the mean and variance parts of the update gate 54 associated with the first and second portions 52a and 52b, respectively, both also denoted by the subscript z, indicating the update gate 54. The values of U, W and b represent the weights of the unit 12 being trained and the offset, respectively, and follow the conventions of standard gate recurrent neurons (GRUs) with respect to training. Elements within brackets in the form of $[A]^2$ indicate a Hadamard product of, for example, the indicated weight vector. It will be appreciated that this is a linear transform. These intermediate outputs are further processed and compressed as follows to provide the output of the update gate 54:

$$a_m = \sigma_m(o_m, o_s) \approx \sigma\left(\frac{o_m}{\sqrt{1+\zeta^2 o_s}}\right) \tag{2}$$

$$a_s = \sigma_s(o_m, o_s) \approx \sigma\left(\frac{v(o_m + \omega)}{\sqrt{1+\zeta^2 v^2 o_m}}\right) - a_m^2$$

A normal sigmoid function σ will produce a transformation that does not necessarily result in a distribution within the exponential family. Accordingly, the activation outputs $a_m$, $a_s$ which approximately follow a distribution using a closed form approximation of a may be used per the above equation (2). The use of distributions in the exponential family for general neural networks are known but not in the context of uncertainty measurement.

Similarly, the reset gate 58 operates on its inputs as follows:

$$o_{r,m}{}^{t}=U_{r,m}x_m{}^t+W_{r,m}s_m{}^{t-1}+b_{r,m}$$

$$o_{r,s}{}^t = U_{r,s}x_s{}^t + W_{r,s}h_s{}^{t-1} + b_{r,s} + [U_{r,m}]^2 x_s{}^t + U_{r,s}[x_m]^2 + [W_{r,m}]^2 h_s{}^{t-1} + W_{r,s}[h_m{}^{t-1}]^2 \quad (3)$$

Producing intermediate values $o_{r,m}{}^t, o_{r,s}{}^t$ are interpreted using the conventions discussed above. These intermediate outputs are further processed and compressed as follows using the above described approximation of the sigmoid function of equation (2) to provide the output of the reset gate 58.

It is noted that in each of these examples, and the example of the state output gate to be discussed below, the data from the mean and variance are not independently processed but rather the variance data is modified by the mean data. This modification, being an interaction between the first and second portions of each data, preserves the "distribution property" of the variance so that it remains in the exponential family after modification by the unit 12. A similar approach is used with the decoder network 18.

Continuing with the description of the processing path of each unit 12, the output of the first portion 52a of update gate 54 goes to the first input of second multiplier 60 and to an input of a first portion 70a of a complementing block 72. The output of the second portion 56b of the update gate 54 goes to the second input of the third multiplier 64 and to the second portion 70b of complementing block 72. This complementing block 72 simply performs a complement (subtracting its input from one).

The output of the first portion 70a of the complementing block 72 goes to the first input of fifth multiplier 80, and the output of the second portion 70b goes to the first input of a sixth multiplier 82.

The output from the first portion 56a of reset gate 58 goes to the second input of second multiplier 62, and the output of second portion 56b of the gate 58 goes to the second input of fourth multiplier 66.

The output of second multiplier 62 goes to a first portion 74a of a state candidate block 76, and the output of fourth multiplier 66 goes to the second portion 74b of this state candidate block 76. The first portion 74a also receives input $x_m$ while the second portion 74b receives $x_s$. The state candidate block 76 performs a linear transformation as follows:

$$o^t_{\hat{h},m} = U_{\hat{h},m} x^t_m + W_{\hat{h},m} h^{t-1}_m + b_{\hat{h},m} \quad (4)$$

$$o^t_{\hat{h},s} = U_{\hat{h},s} x^t_s + W_{\hat{h},s} h^{t-1}_s + b_{\hat{h},s} + [U_{\hat{h},m}]^2 x^t_s + U_{\hat{h},s}[x^t_m]^2 + [W_{\hat{h},m}]^2 \hat{h}^{t-1}_s + W_{\hat{h},s}[h^{t-1}_m]^2$$

and a nonlinear transformation that approximates the hyperbolic tangent function as follows to provide the output of the state candidate block 76:

$$a_m = \tanh_m(o_m, o_s) \approx 2\sigma\left(\frac{o_m}{\sqrt{\frac{1}{4}+\zeta^2 o_s}}\right) - 1 \quad (5)$$

$$a_s = \tanh_s(o_m, o_s) \approx 4\sigma\left(\frac{v(o_m+\omega)}{\sqrt{1+\zeta^2 v^2 o_s}}\right) - a_m^2 - 2a_m - 1$$

The output of the first portion 74a of the state complement block 76 goes to the second input of fifth multiplier 80, and the output of the second portion 74b goes to the second input of a sixth multiplier 82.

The outputs of multipliers 80 and 82 go to the second inputs of summing block 84 and summing block 86 respectively. The first inputs of these summing box 84 and 86 receive outputs of multipliers 60 and 64 respectively and the outputs of the summing box 84 and 86 provide the outputs $h_m$, $h_m$, respectively so that those outputs can be represented as a time series:

$$h_m{}^t = (1-z_m{}^t) \odot \hat{h}_m{}^t + z_m{}^t \odot h_m{}^{t-1}$$

$$h_s{}^t = [(1-z_s{}^t)]^2 \odot \hat{h}_m{}^t + [z_s{}^t]^2 \odot h_s{}^{t-1} \quad (6)$$

where $\odot$ is the Hadamard product . . . .

Figure 3:
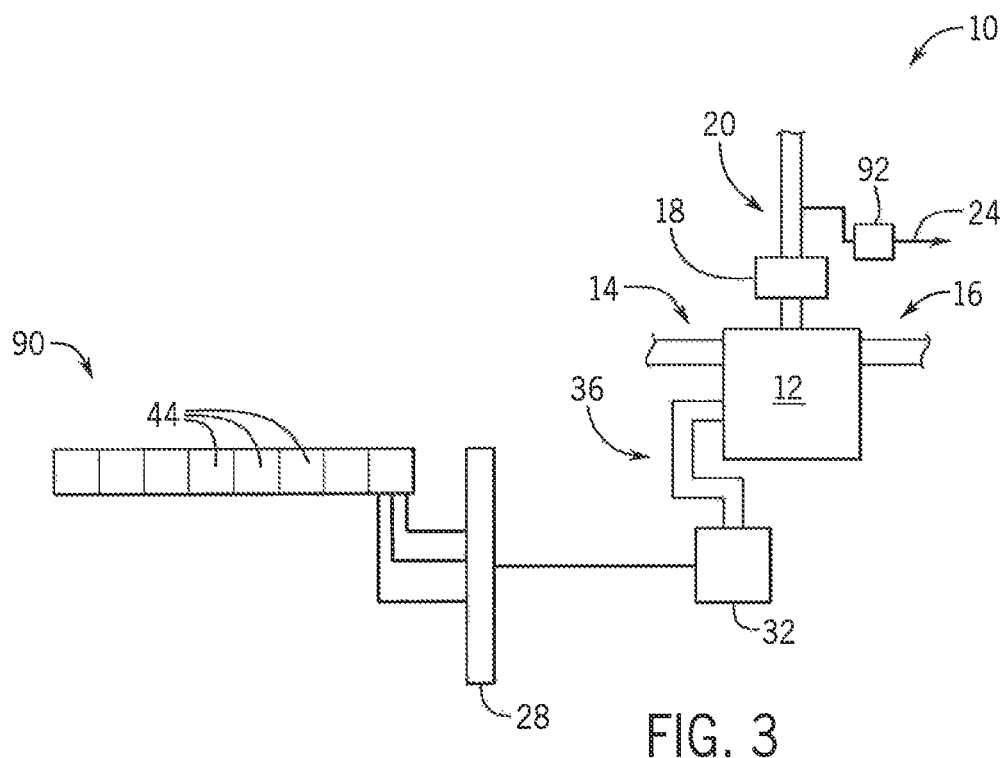
FIG. 3 is a fragmentary view similar to FIG. 1 showing use of the neural network of FIG. 2 for processing non-training data.

Referring now to FIG. 3, once the neural network architecture 10 has been trained, it may receive a standard sequence of data 90 to be analyzed also having data elements 44 that are arranged in one-element columns associated with an index variable used in sequences stated to the units 12 as discussed above with respect to the training set 40. This data 90 is received by the clocking and buffering circuitry 28 and provided to the moment extractor 32 which provides each unit 12 with a mean equal to the value of the given data element 44 for the respective column and variance equal to zero. This input data 90 is processed by successive iterations of the units 12 as shown in FIG. 1.

The results of the processing by the units 12 of the neural network architecture 10 produce values of $h_m$ and $a_m$ providing the desired classification or prediction of the input data 90 by the neural network architecture 10. This processing also provides values of $h_s$ and $a_s$ which are nonzero despite the input of zero values of variance to the first unit 12 of the first layer 26a. These nonzero values provide measures of uncertainty.

Referring to FIG. 2, the output $a_s$ may be received by a threshold comparator 92 that can provide an uncertainty output 24 if uncertainty in the operation of the neural network architecture 10 exceeds a certain value 93 which may be either empirically set to a constant value or may be adjusted according to the criticality of the processing derived from an alternative source. While the threshold comparator 92 may produce a binary value (certain or uncertain) it will be understood that the threshold comparator 92 may alternatively provide a continuous uncertainty output 24 where variations in uncertainty may be used to drive the process. For example, the uncertainty value 24 may be used to override the output value $a_m$ or otherwise modify that value when the uncertainty level is too high for reliance to be placed in the output value $o_m$.

Figure 4:
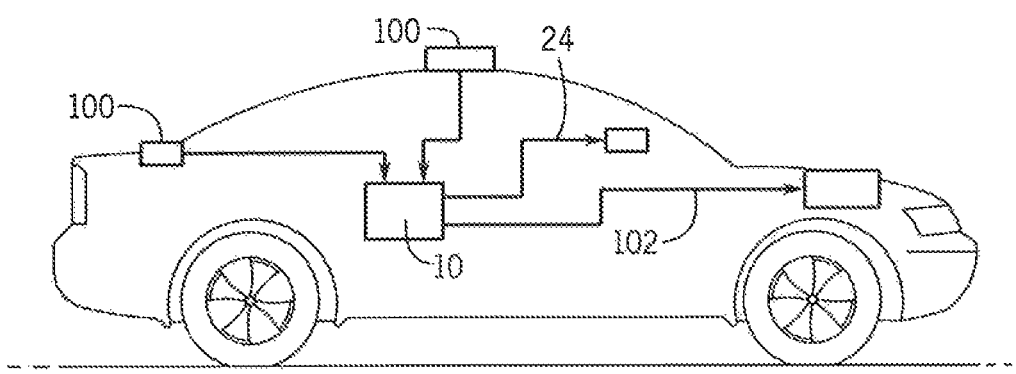
FIG. 4 is a phantom view of an autonomous automobile and its sensor system such as may employ the present invention to read in sensor data and provide output warnings or vehicle control based on uncertainty.

Referring now to FIG. 4, in one example application, the neural network architecture 10 of the present invention may receive sensor data from sensors 100, for example, including any or multiple of radar, Lidar, camera data, GPS signals, or the like and may provide for output control signals 102 controlling the vehicle engine and steering, for example, an autonomous vehicle control. In one application, uncertainty output 24 may be passively provided to the driver (for example, on a dashboard display) to indicate the certainty of the operation of the neural network architecture 10 so that the driver may assume control at points of high uncertainty. Alternatively, or in addition, the uncertainty signal 24 may modify the control signal 102, for example, to slow the vehicle or stop the vehicle completely when uncertainty levels rise beyond a predetermined amount.

In reviewing this description of the invention, it will be appreciated generally that the signals and data described herein are electrical signals and data processed by electronic hardware at high rates of speed beyond the speeds possible by any human being and further that the system cannot practically be practiced manually without such electronic circuitry. Generally, the invention will be executed on special-purpose hardware, for example, including custom processors or graphics processing engines.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a processor and the like can be understood to include one or more processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. The term "architecture" including "computer architecture" and "neural network architecture" is not intended to be limited to VSLI or low-level architectures but generally embrace construction design of computers.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A neural network architecture comprising:
   at least one integrated circuit to implement:
   a first and second input channel;
   a first and second output channel; and
   a processing path from the first and second input channels to the first and second output channels through units having weights trained with respect to data having different statistical moments with the different statistical moments input on the first and second input channels, the units providing interaction between data of the first and second input channels and at least one of the units providing a set of functional elements providing a linear transformation of an input to a neuron using weights and offsets followed by a nonlinear transformer preserving a family of a moment distribution of the second input channel;
   wherein the processing path provides an output on the second output channel indicating an uncertainty of results expressed on the first input channel.

2. The neural network architecture of claim 1 wherein the units are implemented with at least one recurrent unit.

3. The neural network architecture of claim 2 wherein the recurrent unit is a gated recurrent unit.

4. The neural network architecture of claim 1 wherein the weights are obtained by training with inputs on the second input channel having a statistical moment selected from an exponential family of distributions.

5. The neural network architecture of claim 4 wherein the second input channel has a statistical moment of variance.

6. The neural network architecture of claim 3 wherein each gated recurrent unit provides a set of functional elements operating on inputs to the gated recurrent unit to produce outputs from the gated recurrent unit wherein each functional element provides two halves processing signals associated, respectively, with a first output signal on the first output channel and a second output signal on the second output channel wherein each of the two halves provides both independent weight and bias factors.

7. The neural network architecture of claim 1 further includes a decoder neural network receiving signals from at least one output channel to provide further decoding of a signal on the at least one output channel.

8. The neural network architecture of claim 1 further including a threshold detector implemented by the at least one integrated circuit and adapted for monitoring a signal on the second output channel to indicate an uncertainty beyond a predetermined threshold.

9. The neural network architecture of claim 1 further including a clocking circuit for providing successive data elements from the first and second input channels of a unit and for conducting an output from the unit back to an input of the unit for a predetermined number of cycles to implement the neural network architecture.

10. The neural network architecture of claim 1 further including a moment extractor implemented by the at least one integrated circuit and adapted for extracting a first and second moment from a teaching set having multiple examples providing a series of data, wherein the moment extractor extracts two different moments across examples aligned with common indices of the series of data.

11. A method of processing data with a neural network comprising:
    at least one integrated circuit to implement:
    a first and second input channel;
    a first and second output channel; and
    a processing path from the first and second input channels to the first and second output channels through units having weights trained with respect to data having different statistical moments input on the first and second input channels, the units providing interaction between data of the first and second input channels and at least one of the units providing a set of functional elements providing a linear transformation of an input to a neuron using weights and offsets followed by a nonlinear transformer preserving a family of a moment distribution of the second input channel;

the at least one integrated circuit further implements steps of:

(a) training the units with a training set having multiple examples providing a series of data by extracting two different moments across the examples aligned with common indices of the series of data and providing the two different moments to the first and second input channels;

(b) operating the neural network as trained in step (a) by providing a series of data to the first input channel; and (c) receiving from the second output channel an uncertainty of results expressed on the first input channel.

12. The method of claim 11 wherein the two different moments extracted from the training set are of an exponential family.

13. The method of claim 11 wherein the two different moments are mean and variance.

* * * * *